US012337672B2

(12) United States Patent
Collignon et al.

(10) Patent No.: US 12,337,672 B2
(45) Date of Patent: Jun. 24, 2025

(54) BATTERY ENERGY STORAGE SYSTEMS MOUNTING

(71) Applicant: TROVA COMMERCIAL VEHICLES INC, Dublin, VA (US)

(72) Inventors: Patrick Collignon, Dublin, VA (US); Maxell Collignon, Dublin, VA (US)

(73) Assignee: TROVA COMMERCIAL VEHICLES INC, Dublin, VA (US)

( * ) Notice: Subject to any disclaimer, the term of this patent is extended or adjusted under 35 U.S.C. 154(b) by 341 days.

(21) Appl. No.: 18/041,260

(22) PCT Filed: Aug. 11, 2021

(86) PCT No.: PCT/US2021/071160
§ 371 (c)(1),
(2) Date: Feb. 10, 2023

(87) PCT Pub. No.: WO2022/036364
PCT Pub. Date: Feb. 17, 2022

(65) Prior Publication Data
US 2023/0302889 A1    Sep. 28, 2023

Related U.S. Application Data

(60) Provisional application No. 63/064,795, filed on Aug. 12, 2020.

(51) Int. Cl.
*B60K 1/04*    (2019.01)
*H01M 50/242*    (2021.01)
(Continued)

(52) U.S. Cl.
CPC ............ *B60K 1/04* (2013.01); *H01M 50/242* (2021.01); *H01M 50/244* (2021.01);
(Continued)

(58) Field of Classification Search
CPC ............ B60K 1/04; B60K 2001/0494; H01M 50/249; H01M 50/244; H01M 50/242;
(Continued)

(56) References Cited

U.S. PATENT DOCUMENTS 9,112,202 B2 *    8/2015    Park .................... H01M 50/209
9,853,275 B2 *    12/2017    Maguire ............. H01M 50/209
(Continued)

FOREIGN PATENT DOCUMENTS

EP    2712788 A2    4/2014
EP    3064389 A1    9/2016

OTHER PUBLICATIONS

International Preliminary Report on Patentability, mailed on Feb. 23, 2023, from International Application No. PCT/US2021/071160, filed on Aug. 11, 2021. 8 pages.
(Continued)

*Primary Examiner* — Jason D Shanske
*Assistant Examiner* — James J Triggs
(74) *Attorney, Agent, or Firm* — HoustonHogle LLP

(57) ABSTRACT

A mounting structure for a series of electric battery packs (21); such packs get mounted between the two lateral chassis rails (11, 12) of a medium or heavy-duty electric vehicle. The battery packs get inserted through either the forward-facing or rear-facing ends of the chassis frame. Such chassis frame is created by joining a set of double up frame rails (11, 12) together with U-shaped cross members (32), allowing access to the interior of the chassis frame, and allowing a simplified removal and replacement of batteries for maintenance purposes.

4 Claims, 4 Drawing Sheets

(51) Int. Cl.
  *H01M 50/244* (2021.01)
  *H01M 50/249* (2021.01)
(52) U.S. Cl.
  CPC ... *H01M 50/249* (2021.01); *B60K 2001/0494* (2013.01); *H01M 2220/20* (2013.01)
(58) Field of Classification Search
  CPC .............. H01M 2220/20; Y02E 60/10; B60Y 2200/142
  See application file for complete search history.

(56) References Cited

U.S. PATENT DOCUMENTS

| | | | |
|---|---|---|---|
| 11,309,609 B2* | 4/2022 | Ishibashi | H01M 50/249 |
| 11,745,773 B2* | 9/2023 | Soule | B61F 19/04 |
| | | | 246/218 |
| 11,984,569 B2* | 5/2024 | Sasaki | H01M 50/249 |
| 12,218,375 B2* | 2/2025 | Tononishi | H01M 50/293 |
| 2009/0000843 A1* | 1/2009 | Burchett | B60R 16/04 |
| | | | 180/68.5 |
| 2018/0194211 A1* | 7/2018 | Hamilton | B60L 50/66 |
| 2020/0331334 A1* | 10/2020 | Sloan | B60K 1/04 |
| 2021/0188069 A1* | 6/2021 | Friedman | B62D 27/06 |
| 2023/0302889 A1* | 9/2023 | Collignon | H01M 50/242 |

OTHER PUBLICATIONS

International Search Report and Written Opinion of the International Searching Authority, mailed on Nov. 2, 2021, from International Application No. PCT/US2021/071160, filed on Aug. 11, 2021. 13 pages.

* cited by examiner

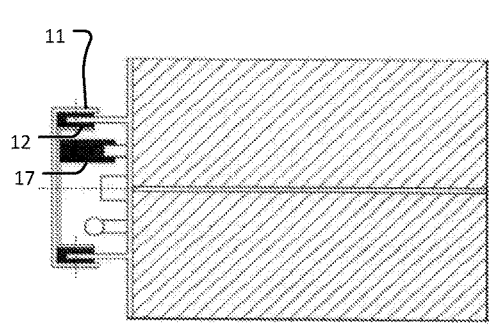
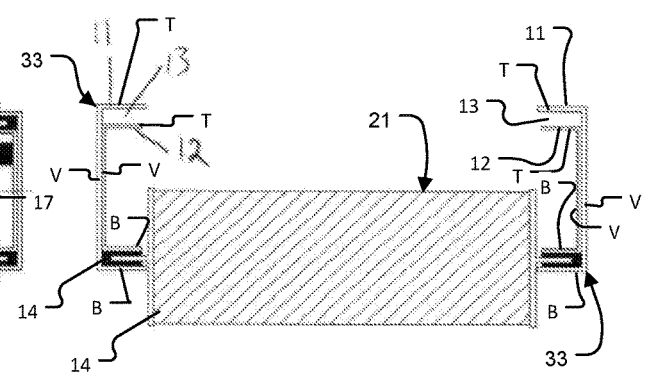
Fig. 1A
Fig. 1B
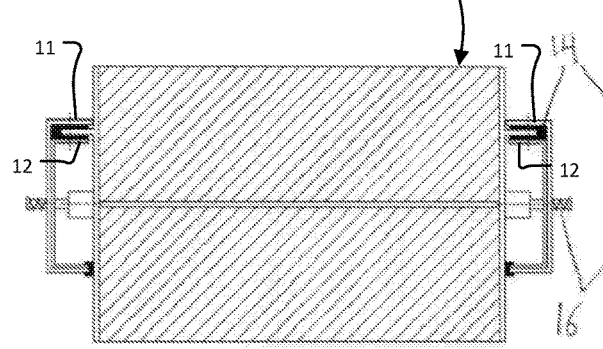
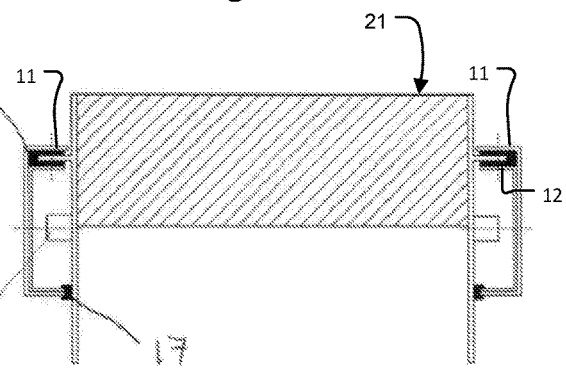
Fig. 1C
Fig. 1D
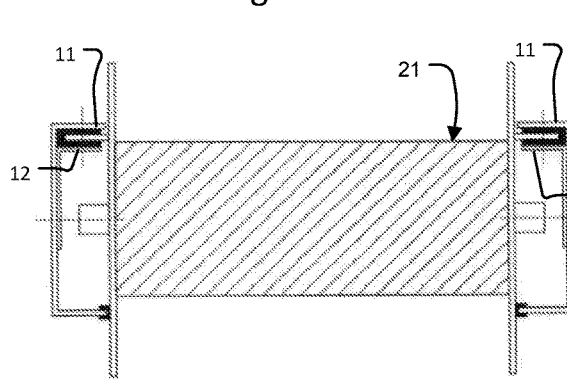
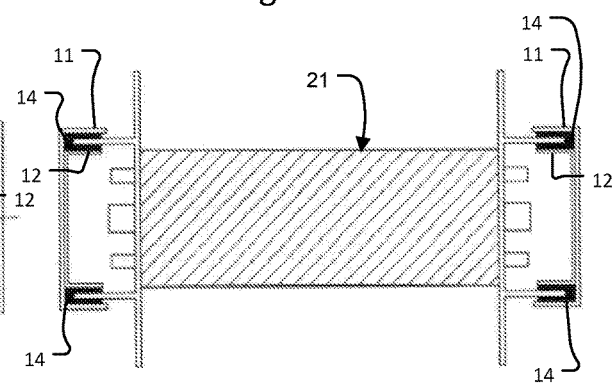
Fig. 1E
Fig. 1F

BATTERY ENERGY STORAGE SYSTEMS MOUNTING

RELATED APPLICATIONS

This application is a § 371 National Phase Application of International Application No. PCT/US2021/071160 filed on Aug. 11, 2021, now International Publication No. WO 2022/036364, published on Feb. 17, 2022, which International Application claims the benefit under 35 U.S.C. § 119(e) of U.S. Provisional Application No. 63/064,795, filed on Aug. 12, 2020, both of which are incorporated herein by reference in their entirety.

BACKGROUND OF THE INVENTION

In the medium and heavy-duty truck industry the chassis frame of the vehicle includes two lateral frame rails running in the longitudinal direction of the vehicle. At least one cross-member is mounted between the lateral frame rails to provide rigidity to the frame. Also, within this industry, it is a recognized practice to double up on the frame rails, with for example an L or a C shape, to increase strength and load bearing capacity. Each side of the chassis frame will then have one larger outer frame rail with an inner and outer surface, and one smaller inner frame rail with an inner and outer surface. This inner frame rail is oriented in the same direction as the outer frame rail, so that the outside surface of the inner frame rail touches the inside surface of the outer frame rail. Within the industry, chassis frames are utilized to attach components or subassemblies (multiple components assembled prior to final mounting) to the chassis vehicle. Traditionally, the industry attaches sub assembled battery packs with corresponding brackets to the outside of said chassis frame. Said brackets are usually heavy and bulky due to the extreme torques and forces applied to the vehicle while in transit. This in turn creates an increase in vehicle weight, a reduction of available space on the chassis frame, an increase in parts and processes, and often creates un-ergonomic installation conditions and maintenance difficulties for the customer.

European patent EP 2 712 788 B1, published Feb. 26, 2020, by MAN Truck & Bus SE, Munich, Germany, discloses a frame for a commercial vehicle, preferably a lorry, with a rear box for at least one vehicle component. The frame comprises a crash protection structure and the rear box may contain e.g. an electric battery pack.

European patent EP 3 064 389 B1, published Jan. 20, 2021, by Toyota Jidosha KK, Japan, discloses a battery unit mounting structure for an electric vehicle. To reduce damage to the battery unit in case of impact on the vehicle, a reinforcement structure is provided.

US patent application number US 2018/0194211 A1, by GM Global Technology Operations, published Jul. 12, 2018, discloses structural enhancements of an electric vehicle, including a bushing mount and a battery pack.

SUMMARY OF THE INVENTION

According to the battery mounting systems disclosed in the prior art so far, it is difficult to mount the battery backs in the mounting system, and once mounted, it remains difficult to uninstall the battery packs. The latter may be required e.g. in case of maintenance of the packs.

A goal of the present invention can be to remedy the above disadvantages and drawbacks.

The present invention relates to a mounting structure for an electric battery, comprising electric energy storage packs. Such structure is for use in an electric vehicle.

In particular, the present invention relates to a mounting structure enabling the integration of battery packs to a chassis frame that includes two longitudinal frame rails and multiple cross-members. The mounting structure according to the present invention can be applied in a medium or heavy-duty electric vehicle.

Further, the invention relates to a mounting structure or system enabling the installation of the battery packs by sliding them between the chassis rails from the forward- or rear-facing side of the longitudinal frame rails.

Through the use of the mounting structure, the battery packs get inserted through either the forward-facing or rearm-facing ends of the chassis frame. Such chassis frame is created by joining either a single, but preferably a double set of frame rails together with a U-shaped cross member, allowing access to the interior of the chassis frame, and allowing a simplified removal and replacement of batteries for maintenance purposes.

In particular, such electric battery mounting structure can be used in a medium or heavy-duty electric vehicle, the battery mounting structure comprising:
a chassis frame made up of:
two U-shaped longitudinal side rails, (33) each longitudinal side rail comprising a U-shaped smaller inner frame rail (12) and a U-shaped larger outer frame rail (11), the vertical part of the U-shaped frame rails being larger than the two horizontal parts of the U-shaped frame rails,
the inner and outer frame rails being positioned such that the openings of the U-shaped inner and outer frame rails are oriented to the inside of the chassis frame, for each side rail, the outer surface of the vertical part of the inner frame rail (12) touching the inner surface of the vertical part of the outer frame rail (11),
one or more U shaped cross member(s) (32), each cross member comprising a main portion and two end-sections wherein each end section comprises an inner surface suitable for joining up to an outer surface of the outer side rails (11) of the longitudinal side rails (33),
in each side rail (33) of the chassis frame, the size of the vertical part of the inner frame rail (12) being smaller as compared to the size of the vertical part of the outer frame rail (11) thereby creating a mounting channel (13) between the outer frame rail's (11) inside top and/or bottom surfaces, and the inner frame rail's (12) outside top and/or bottom surfaces; and
the mounting structure further comprising
a plurality of complementary shaped restraining brackets (22) to the frame rails, whereto electric battery packs are fixed,
whereby the brackets comprise protrusions (23) sliding in the mounting channel (13) between the inner frame rail (12) and the outer frame rail (11).

According to a preferred embodiment of the invention, the mounting channels (13) within such mounting structure comprise pads (14) enhancing the sliding of the electric battery packs.

According to a further preferred embodiment of the invention, the battery packs comprise mounts, (15) enabling the packs to be securely fixed to the chassis frame either to the horizontal sides, either top or bottom flange or both, of the frame rails by a fix mounting inside the mounting channel, or to the vertical sides of the frame rails.

According to a further preferred embodiment of the invention, the mounts comprise fixations made of a flexible medium, preferably springs or rubber bushings, allowing chassis movement and vibration without damaging the battery packs.

Further preferred embodiments are set forth in the dependent claims set forth hereinafter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1A-1F show a few examples of cross-sections of configurations in which the battery packs can be mounted between the opposing frame rails according to an embodiment of the invention;

Figure 2:
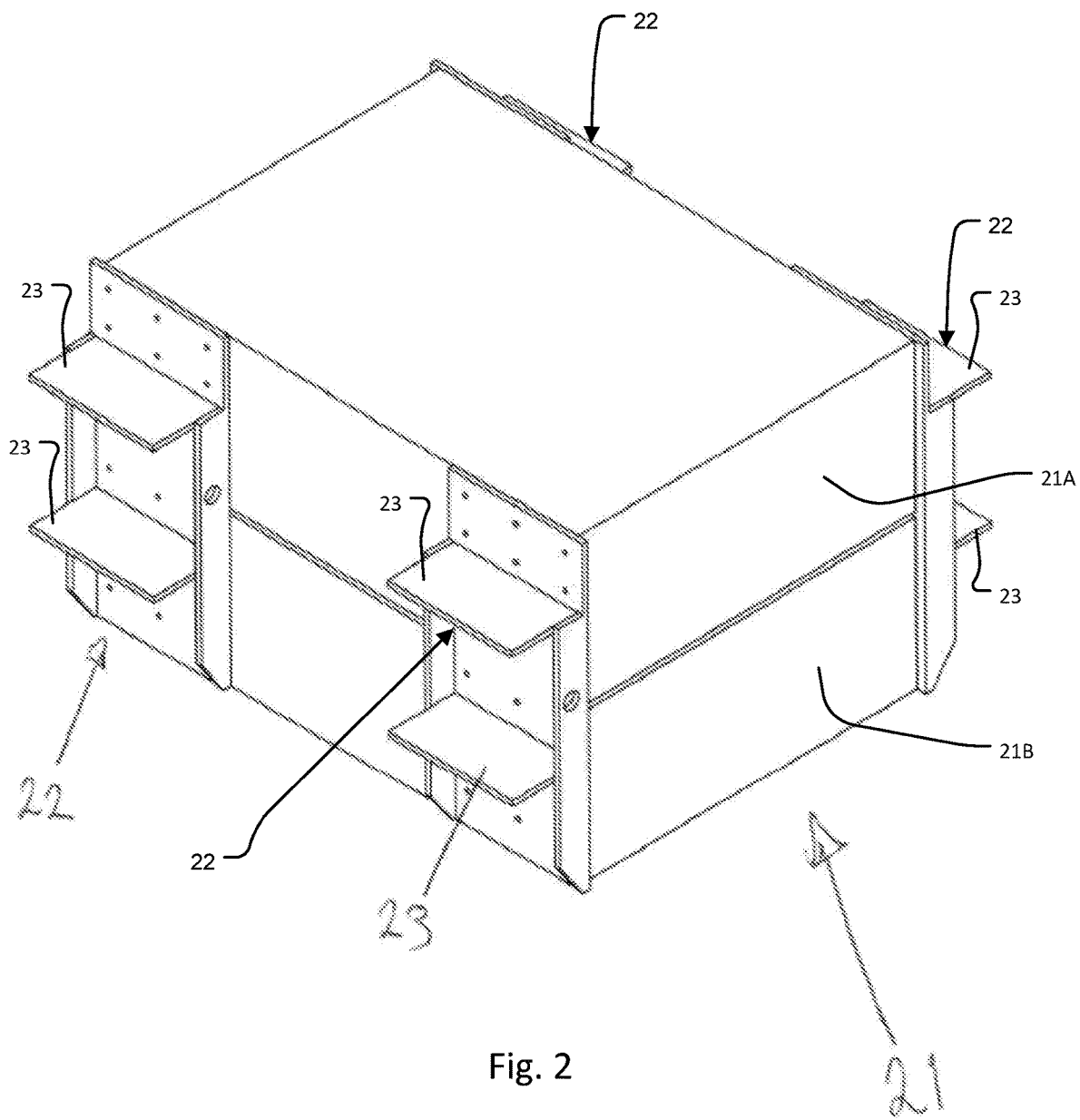
FIG. 2 shows a perspective view of the mounting bracket, used for the embodiment shown in FIG. 1A, that slides in the gap between the separated top and bottom surfaces of the inner and outer frame rails on either side of the chassis frame, to secure the battery packs in place.

In the figures, the following reference signs denote the following parts:

11 denotes the outer frame rail of a longitudinal side rail;
12 denotes the inner frame rail of a longitudinal side rail;
13 denotes the sliding channel between both flange parts;
14 denotes a damper to protect the packs from the transfer of vibrations;
15 denotes a mount to securely fix a pack to the sliding channel;
16 denotes a horizontal mount to securely fix the pack to the frame rail;
17 denotes a rubber bushing for lateral sliding as well as a dampening to ensure the battery packs are securely fixed between the chassis frames;
21 denotes a combination of two battery packs used in the battery mounting structure according to the invention;
22 denotes brackets affixed to the battery packs;
23 denotes protrusions of the battery brackets (22);
31 denotes an electric battery mounting structure according to the invention;
32 denotes a U-shaped cross member;
33 denote the two U-shaped longitudinal side rails of the chassis frame.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New battery mounting integration and positioning systems are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or descriptions below.

The present invention will now be described by referencing the appended figures representing preferred embodiments.

FIG. 2 depicts a perspective view of an example of a battery mounting structure 21 comprised of two battery packs. The battery mounting structure may be a plurality of battery packs (2 battery packs 21A, 21B shown in FIG. 2) and in preferred embodiments can range from a single battery pack to six or more battery packs.

FIG. 1A-1F depicts several examples of cross sectional views of different battery mounting structures 21 to the chassis frames 31. Said chassis frames 31 are generally made up of two U-shaped longitudinal side rails 33. Each side rail 33 comprises one larger outer frame rail 11 with an inner and outer surface, and one smaller inner frame rail 12 with an inner and outer surface. Said inner frame rail 12 is oriented in the same direction as said outer frame rail 11 but nests so as the outside of the surface of the inner frame rail 12, touches the inside surface of the outer frame rail 11. Each of these frame rails has a vertical wall V and a horizontal top wall T and horizontal bottom wall B. See FIG. 1B. Generally, the horizontal top wall T and horizontal bottom wall B of the inner frame rail 12 act as underlying support for the horizontal top wall T and horizontal bottom wall B of the outer frame rail 11. Referring now to FIG. 1A through FIG. 1F, said inner frame rail's 12 vertical length gets reduced to create a void or mounting channel 13, between the outer frame rail 11 and the inner frame rail 12. In some embodiments, the vertical height of the inner frame rail 12, only gets reduced on the top (see FIGS. 1C and 1D) or on the bottom. In other embodiments, the void 13 gets created both on the top and the bottom (see FIGS. 1A, 1B, and 1F).

An example of a cross sectional view where only one mounting channel 13 is utilized is depicted in FIG. 1C, FIG. 1D and FIG. 1E. The battery mounting structure 21 may comprise a rubber bushing 17 or similar dampening material to simplify the assembly process and protect the battery packs from vibration.

An example of a cross sectional view where both mounting channels 13 are utilized is depicted in FIG. 1A, FIG. 1B, FIG. 1F. The battery mounting structure 21 may utilize both mounting channels to provide a rigid support for a plurality of either single FIG. 1B and FIG. 1F or paired FIG. 1A battery packs.

Both U-shaped longitudinal side rails 33 of the chassis frame 31 are then joined together by at least one U-shaped cross member 32, comprising a main portion and two end sections wherein each end section comprises an inner surface for joining up to an outer surface of the outer longitudinal frame rails 33, throughout the main body of the chassis frame 31. A vehicle axle assembly 52 is then connected to the frame 31 via a suspension system such as leaf springs 50. Depending on the layout of the chassis and vehicle application, multiple U-shaped cross members 32 may be needed or alternated by inside or chassis-end mounted cross members.

Figure 3:
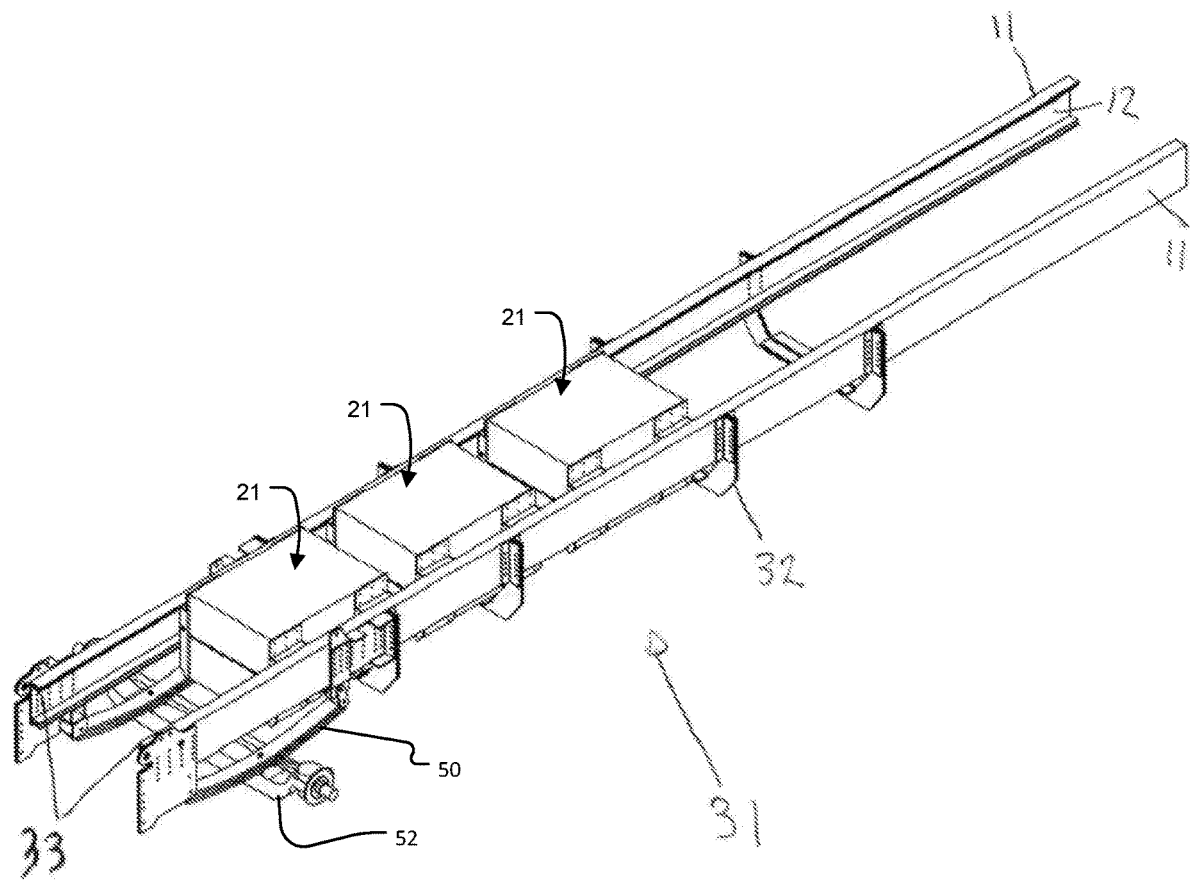
FIG. 3 is a perspective view showing an example of a battery pack integration to a chassis frame assembly with two chassis rails, at least one cross member, and at least one battery pack according to an embodiment of the invention and its use in a chassis frame structure for an electric vehicle.
Figure 4:
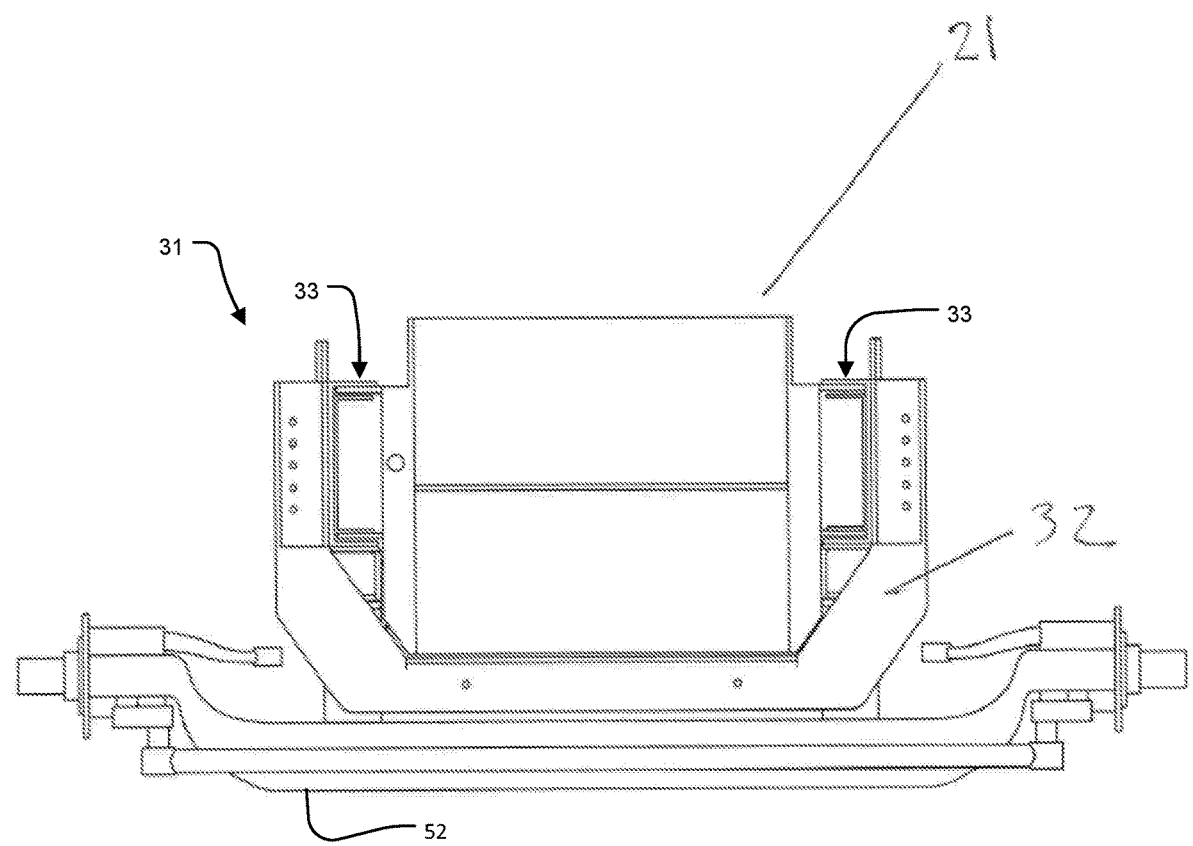
FIG. 4 shows a cross-sectional view of the battery pack integration to a chassis frame assembly with two chassis rails, at least one cross member, and at least one battery pack according to an embodiment of the invention and its use in a chassis frame structure for an electric vehicle.

FIG. 3 depicts a perspective view of an example of a battery mounting structure 21 mounted to a chassis frame 31 according to various embodiments of the present invention. And, FIG. 4 depicts a cross-sectional view of an example of a battery mounting structure 21 mounted to a chassis frame 31 according to various embodiments of the present invention. The battery mounting structure 21 includes a plurality of brackets 22 (4 brackets 22 depicted in FIG. 2) that have complimentary shapes to the mounting channel 13, created on the examples of chassis frame structures shown on FIG. 1A through FIG. 1F, as to allow the battery mounting structure to slide and nest within said mounting channel 13, between the inner frame rail 12 and the outer frame rail 11, through the front facing or rear facing side of the chassis frame 31.

In an embodiment with the invention, said bracket's 22 nesting protrusion 23, can be padded 14 by rubber or similar type of material to enhance the sliding of the packs in the mounting channel 13 between the inner frame rail 12 and the outer frame rail 11, and can serve as a damper to protect the packs form the transfer of chassis vibrations. Through the plurality of complementary shaped restraining brackets (22) to the frame rails, the electric battery packs are fixed and can be fixed in place to the chassis frame.

The battery mounting structure has a fix mounting inside the mounting channel and can be secured either by means of a vertical mounting 15, shown on FIG. 1A, from the horizontal sides (top or bottom flange) of the chassis rails, or by means of a horizontal mount 16 from the vertical side flange of the chassis rails. In some embodiments, said mountings can be achieved by using fixations using some sort of flexible medium, such as but not limited to springs or rubber bushings, to allow for chassis movement and vibration without damaging the battery packs.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electric battery mounting structure for use in a medium or heavy-duty electric vehicle, the battery mounting structure comprising:
    a chassis frame made up of:
        two U-shaped longitudinal side rails, each longitudinal side rail comprising a U-shaped smaller inner frame rail and a U-shaped larger outer frame rail, the vertical part of the U-shaped frame rails being larger than the two horizontal parts of the U-shaped frame rails, the inner and outer frame rails being positioned such that the openings of the U-shaped inner and outer frame rails are oriented to the inside of the chassis frame, for each side rail, the outer surface of the vertical part of the inner frame rail connected to the inner surface of the vertical part of the outer frame rail,
    one or more U shaped cross member(s), each cross member comprising a main portion and two end-sections wherein each end section comprises an inner surface for connecting to an outer surface of the outer frame rails of the longitudinal side rails,
    in each side rail of the chassis frame, the size of the vertical part of the inner frame rail being inferior as compared to the size of the vertical part of the outer frame rail thereby creating a mounting channel between the outer frame rail's inside top and/or bottom surfaces, and the inner frame rail's outside top and/or bottom surfaces; and
the mounting structure further comprising a plurality of complementary shaped restraining brackets to the frame rails, whereto electric battery packs are fixed, whereby the brackets comprise protrusions sliding in the mounting channel between the inner frame rail and the outer frame rail.

2. The mounting structure according to claim 1, whereby the mounting channels comprise pads enhancing the sliding of the electric battery packs.

3. The mounting structure according to claim 1, whereby the electric battery packs comprise mounts, enabling the electric battery packs to be securely fixed to the chassis frame, either to a top flange and/or a bottom flange of the horizontal parts of the frame rails by a fixed mounting inside the mounting channel, or to the vertical parts of the frame rails.

4. The mounting structure according to claim 3, the mounts being fixations made of a flexible medium, allowing chassis movement and vibration without damaging the electric battery packs.

\* \* \* \* \*